Patented Apr. 26, 1932

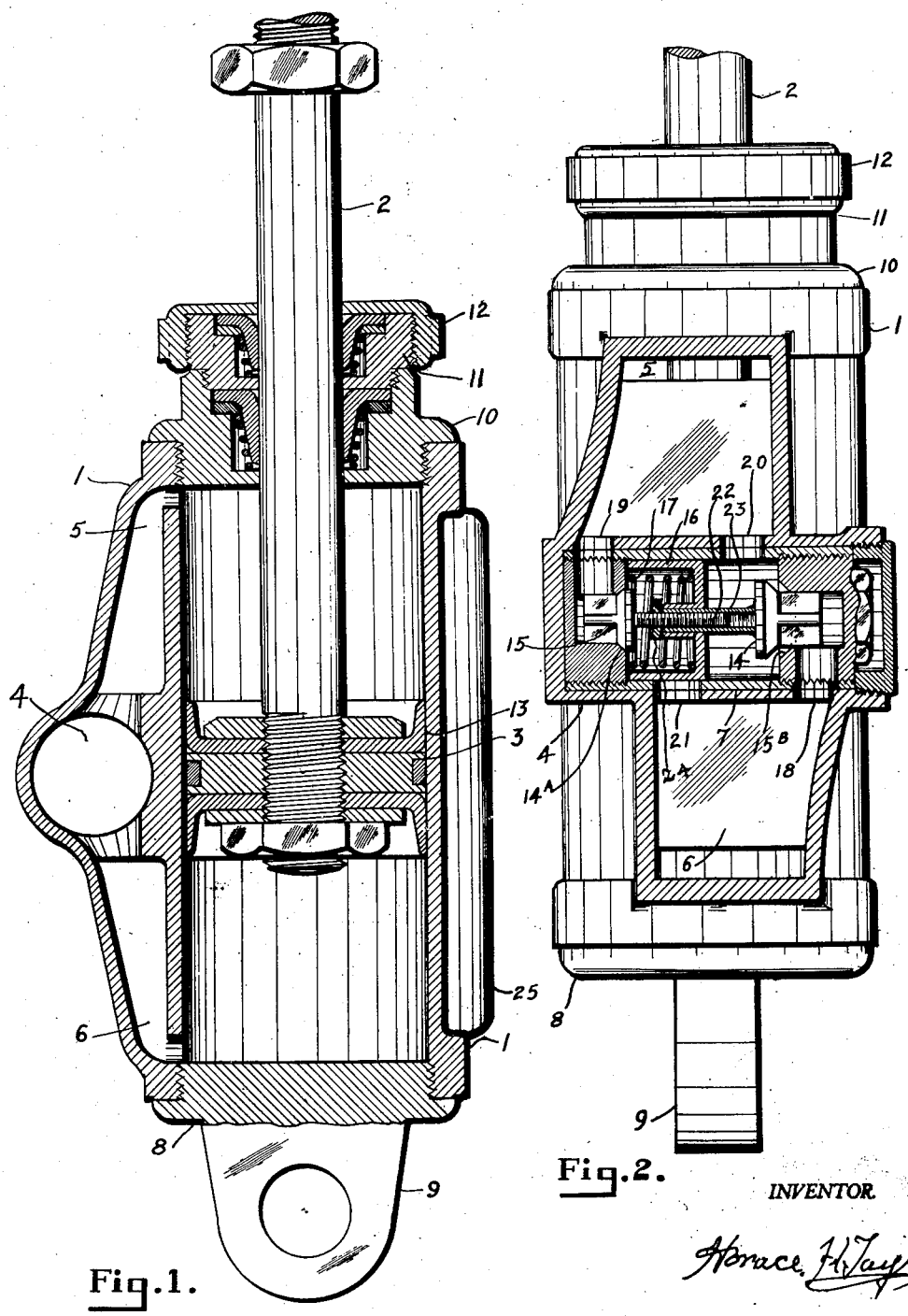

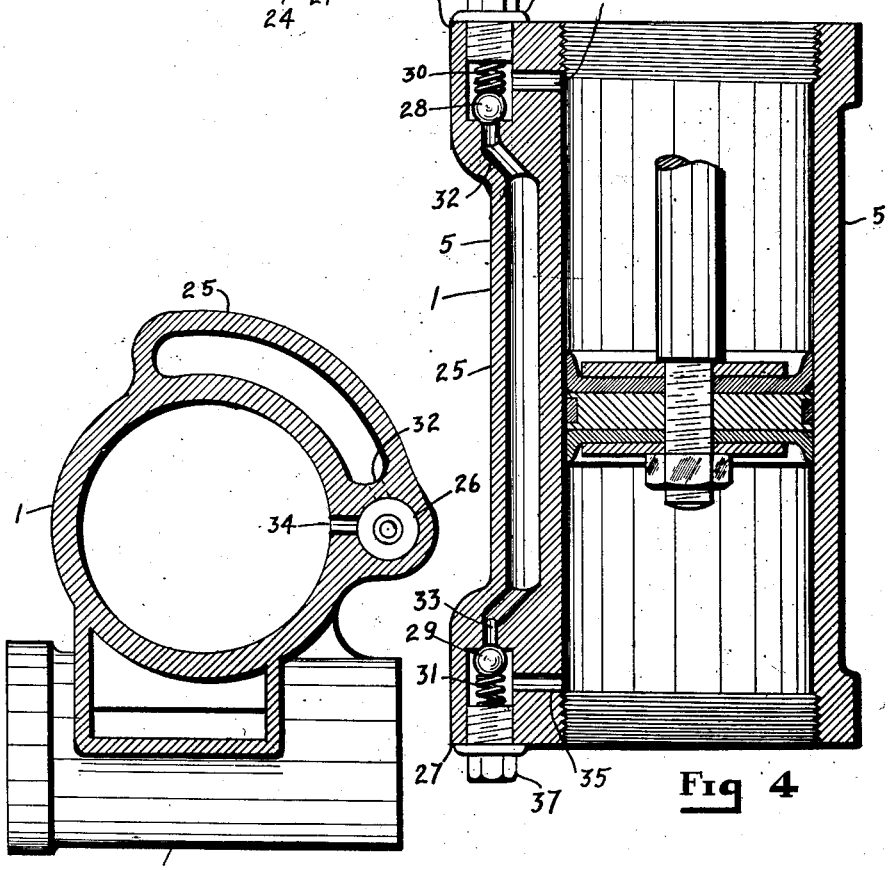

1,855,897

UNITED STATES PATENT OFFICE

HORACE HOUGHTON TAYLOR, OF OAKLAND, CALIFORNIA

HYDRAULIC SHOCK ABSORBER

Application filed December 30, 1929. Serial No. 417,450.

The present invention relates to improvements in hydraulic shock absorbers wherein the operating medium is fluid, and can be attached to a vehicle in a number of different ways, depending upon the conditions required.

One of the objects of this invention is to provide a hydraulic shock absorber of the character described which may be adapted to any type of vehicle and wherein the pistons will function satisfactorily in either direction.

The invention takes into consideration the particular construction and relative arrangement of the valves and associated parts, and, as designed, it is exceptionally strong and durable.

The advantage of having a sufficient supply of fluid for operating purposes always at hand, should there be a leak or seepage, necessitates the addition of a reservoir in conjunction with the cylinder, and, as designed, the valve mechanism is conveniently contained within the reservoir and accessible at all times.

Another advantage of my invention is the valve cage containing the control mechanism by which a greater or lesser amount of fluid is moved automatically in either direction, and the variation in the speed of the piston controlled by the difference in the diameter of the two check valves.

With the above mentioned and other objects in view, the invention consists in the novel construction and combination of parts hereinafter described, illustrated in the accompanying drawings and set forth in the claims hereto appended, it being understood that various changes in the form, proportion, adaptation, size and minor details of construction within the scope of the claims, may be resorted to without departing from the spirit of or sacrificing any of the advantages of the invention.

Referring to the drawings:

Numerals are used to designate the various parts.

Sheet 1, Figure 1 represents a vertical side elevation in section of the hydraulic shock absorber.

Sheet 1, Fig. 2 is a vertical side elevation in section of the by-passes and valve cage.

Sheet 2, Fig. 3 is a sectional view of the valve cage with the valves in the reversed position to that shown in Sheet 1, Figure 1.

Sheet 2, Fig. 4 is a side elevation in section of the hydraulic shock absorber showing the manifold and valve cages.

Sheet 2, Fig. 5 is a sectional view of Fig. 4 through the line 5—5.

Following is a description of Sheet 1, Figures 1 and 2:

1 represents the hydraulic cylinder, 2 piston rod, 3 piston head, 4 cylindrical valve cage container, 5 and 6 by-passes, 7 valve cage, 8 lower cylinder head, 9 lug attached to the lower axle of the vehicle, 10 upper cylinder head, 11 stuffing box, 12 gland, 13 leather packing, 14 and 15 check valves in the valve cage 7; 14a and 15b valve seats in the valve cage 7, 16 annular slide valve, 17 coil spring, 18 and 19 inlet ports, 20 and 21 outlet ports, 22 and 23 threaded valve stems to increase or decrease the volume of fluid that passes the two check valves 14 and 15, and 24 is a lock nut to securely keep the check valves 14 and 15 from changing their relative positions when in operation.

Following is a description of Sheet 2, Figures 3, 4 and 5:

25 is the manifold, 26 and 27 valve cages, 28 and 29 ball valves, 30 and 31 coil springs, 32 and 33 by-passes from the manifold 25 into the valve cages 26 and 27; 34 and 35 discharge ports from the valve cages 26 and 27 into the hydraulic cylinder 1; 36 and 37 valve covers.

A manifold 25 partly surrounds the hydraulic cylinder 1 and contains fluid to replace any leak from the cylinder, said fluid being retained by the ball valves 28 and 29 that are placed at each end of the manifold 25. Coil springs 30 and 31 are placed over the ball valve 28 and 29, causing them to retain their seats.

By-passes 32 and 33 from the manifold 25 to the valve cages 26 and 27 permit of the flow of fluid to the hydraulic cylinder 1 when a partial vacuum is formed above or below the piston head 3, allowing sufficient fluid to escape to fill up the space caused by the leak from the stuffing box 11.

Two check valves 14 and 15, each having valve stems 22 and 23, projecting inwardly therefrom, are placed within the valve cage 7, one of the valve stems 22 being the male member and threaded, while the valve stem 23 has an internal thread permitting of the two check valves 14 and 15 to be lengthened or shortened between the valve seats 14a and 14b, and then can be permanently secured by the lock nut 24.

Following is the mode of operation:

Assuming the shock absorbers are in a vertical position, the nuts shown on the piston rod 2 being uppermost and the piston head 3 moving toward the lower cylinder head 8; fluid below the piston head 3 will move through the by-pass 6 up into the valve cage 7 and through the inlet port 18, past the check valve 14 through the outlet port 20 into the by-pass 5 and above the piston head 3.

As it is the upward movement of the chassis that acts the quickest, owing to the springs, the check valve 15 is not as large in diameter as the check valve 14, and when the reverse movement of the piston head 3 takes place and the piston head 3 moves upward, the fluid in the upper end of the hydraulic cylinder 1, leaving the by-pass 5 passes down into the valve cage 7 through the inlet port 19, lifting the check valve 15 and causing the annular slide valve 16 to cover the outlet port 20, seating the check valve 14 and relaxing the coil spring 17; thus, the outlet port 20 is closed and the outlet port 21 opens, allowing a smaller amount of fluid to pass, thereby checking the upward speed, than would otherwise take place should both check valves 14 and 15 be of the same diameter.

It will be noted that the valves 14, 15 and 16 will have from right to left as aforementioned, when the piston travels downward, owing to the fact that the combined area of the valves 14 and 15, exposed to the pressure of the fluid at this time, is greater than the area of valve 16 likewise exposed to the fluid. Thus the force of the pressure on the valves 14 and 15 tending to move them to the left is greater than the force tending to move the valve 16 to the right and consequently as said valves 14 and 15 move to the left it is only necessary that an extremely slight movement of valve 14, or in other words the valve 14 need be but slightly cracked when the full area thereof and of the outer end of valve 16 then becomes exposed to force tending to move the valves to the left, whereupon the pronounced differential in the exposed area is such as to insure a rapid completion of the movement of valves 14 and 15 to the left.

I claim:

1. In a hydraulic shock absorber, a hydraulic cylinder provided with a manifold communicated at its ends with said cylinder and forming a space for the retention of fluid, valve cages associated with the manifold containing normally closed valves controlling such communication, springs bearing on said valves, a valve cage container fixed to the hydraulic cylinder and having by-passes connecting it with each end of said hydraulic cylinder, a valve cage within the valve cage container having a spring and three valves, valve seats, and both inlet and outlet ports.

2. In a hydraulic shock absorber, a hydraulic cylinder provided with a manifold communicated at its ends with said cylinder and forming a space for the retention of fluid, valve cages associated with the manifold containing normally closed valves controlling such communication, springs bearing on and normally holding said valves closed, a valve cage container associated with the hydraulic cylinder and having by-passes connecting it with each end of said hydraulic cylinder, a valve cage within the valve cage container having a spring and three valves, valve seats, both inlet and outlet ports, said three valves comprising two check valves, one larger than the other and having threaded stems, a lock nut on one of the valve stems, an annular slide valve between the two check valves, and a coil spring between the small check valve and the annular slide valve.

3. In a hydraulic shock absorber, a cylinder arranged to contain a fluid, a piston reciprocally mounted therein, a valve cage associated with said cylinder and having inlet and outlet ports, said cylinder having by passes connecting opposite ends thereof with said cage ports, two check valves in said cage one larger than the other, a stem common to said valves and a slide valve between the check valves arranged to move with and relative to said check valves, and a spring arranged to urge the slide valve towards the larger check valve.

HORACE HOUGHTON TAYLOR.